US010248286B2

(12) United States Patent
Furukawa et al.

(10) Patent No.: US 10,248,286 B2
(45) Date of Patent: Apr. 2, 2019

(54) IMAGE FORMING APPARATUS

(71) Applicants: Manabu Furukawa, Nagaokakyo (JP); Hideyuki Matsuda, Hirakata (JP); Nobuhiro Mishima, Osaka (JP); Kazusei Takahashi, Nishinomiya (JP); Mitsuharu Nagai, Amagasaki (JP)

(72) Inventors: Manabu Furukawa, Nagaokakyo (JP); Hideyuki Matsuda, Hirakata (JP); Nobuhiro Mishima, Osaka (JP); Kazusei Takahashi, Nishinomiya (JP); Mitsuharu Nagai, Amagasaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 499 days.

(21) Appl. No.: 13/742,090

(22) Filed: Jan. 15, 2013

(65) Prior Publication Data
US 2013/0185665 A1 Jul. 18, 2013

(30) Foreign Application Priority Data

Jan. 16, 2012 (JP) .................................. 2012-006611

(51) Int. Cl.
*G06F 3/0481* (2013.01)
*G06F 3/0486* (2013.01)

(52) U.S. Cl.
CPC ........ *G06F 3/04817* (2013.01); *G06F 3/0486* (2013.01)

(58) Field of Classification Search
CPC .......................... G06F 3/04817; G06F 3/0486
See application file for complete search history.

(56) References Cited

U.S. PATENT DOCUMENTS

| | | | | | |
|---|---|---|---|---|---|
| 3,782,515 | A | * | 1/1974 | Cowen, Jr. ........... | B65G 13/073 192/56.2 |
| 4,709,349 | A | * | 11/1987 | Hashimoto et al. ............ | 714/15 |
| 4,834,563 | A | * | 5/1989 | Ozawa ..................... | B41J 35/36 400/247 |
| 4,955,735 | A | * | 9/1990 | Sakuragi ......................... | 400/83 |
| 5,428,734 | A | * | 6/1995 | Haynes et al. ................ | 715/769 |
| 5,623,675 | A | * | 4/1997 | Mizuki ......................... | 710/260 |

(Continued)

FOREIGN PATENT DOCUMENTS

JP 2000-187564 A 7/2000

*Primary Examiner* — Jung-Mu T Chuang
(74) *Attorney, Agent, or Firm* — Buchanan Ingersoll & Rooney PC

(57) ABSTRACT

An image forming apparatus comprises: a display which allows users to connect a first icon to a second icon on a first screen and is capable of displaying the first screen with a still image of the first icon in motion and a second screen matching an event; a completion detector which detects completion of the connecting operation; a processor which performs an operation predetermined for the first and second icon when the connecting operation is completed; an event detector which detects occurrence of an event during the connecting operation; and a controller which performs, if an event occurs before completion of the connecting operation, a control operation consisting of: storing composition information of the first screen with a still image of the first icon in motion; interrupting the first screen; and reproducing the first screen after disappearance of the second screen on the basis of the composition information.

8 Claims, 8 Drawing Sheets

(56) References Cited

U.S. PATENT DOCUMENTS

| | | | | |
|---|---|---|---|---|
| 5,727,135 A * | 3/1998 | Webb | G06F 3/1204 | 358/1.14 |
| 5,745,111 A * | 4/1998 | Cline | G06F 3/0481 | 715/769 |
| 5,757,368 A * | 5/1998 | Gerpheide | G06F 3/038 | 345/157 |
| 5,760,773 A * | 6/1998 | Berman et al. | 715/808 | |
| 5,764,873 A * | 6/1998 | Magid et al. | 715/769 | |
| 5,786,812 A * | 7/1998 | Yoshikawa | G06F 3/04883 | 173/179 |
| 5,844,690 A * | 12/1998 | Terajima | 358/296 | |
| 5,862,321 A * | 1/1999 | Lamming | G06F 15/0225 | 358/403 |
| 6,042,279 A * | 3/2000 | Ackley | G06K 1/121 | 400/103 |
| 6,043,817 A * | 3/2000 | Bolnick et al. | 715/788 | |
| 6,167,439 A * | 12/2000 | Levine | G06F 3/0483 | 358/408 |
| 6,622,266 B1 * | 9/2003 | Goddard | G06F 11/0733 | 714/44 |
| 6,697,090 B1 * | 2/2004 | Nagasaka | G06F 3/0486 | 715/769 |
| 6,748,183 B2 * | 6/2004 | Edmonds | G06F 3/121 | 399/23 |
| 6,785,023 B1 * | 8/2004 | Iida | H04N 1/00204 | 358/1.15 |
| 6,894,793 B1 * | 5/2005 | Roosen | G06F 3/1207 | 358/1.13 |
| 7,146,293 B2 * | 12/2006 | Badovinac | G03G 15/5079 | 702/188 |
| 7,155,451 B1 * | 12/2006 | Torres | G06F 17/30867 | |
| 7,272,796 B2 * | 9/2007 | Sano et al. | 715/738 | |
| 7,355,733 B2 * | 4/2008 | Sommer | H04N 1/00408 | 358/1.14 |
| 7,444,394 B2 * | 10/2008 | Igarashi | H04L 29/12009 | 709/223 |
| 7,554,680 B2 * | 6/2009 | Kanai et al. | 358/1.1 | |
| 7,570,380 B2 * | 8/2009 | Hart et al. | 358/1.15 | |
| 7,610,394 B2 * | 10/2009 | Katinsky | G06F 17/30053 | 709/217 |
| 7,656,546 B2 * | 2/2010 | Lay et al. | 358/1.15 | |
| 7,697,851 B2 * | 4/2010 | Knodt et al. | 399/8 | |
| 7,958,460 B2 * | 6/2011 | Garrison et al. | 715/812 | |
| 8,019,853 B2 * | 9/2011 | Machida | H04L 41/22 | 709/224 |
| 8,098,585 B2 * | 1/2012 | Jiang et al. | 370/241 | |
| 8,120,596 B2 * | 2/2012 | Popovich | G06F 3/04886 | 345/158 |
| 8,132,877 B2 * | 3/2012 | Gold et al. | 347/7 | |
| 8,209,628 B1 * | 6/2012 | Davidson | G06F 3/0487 | 715/790 |
| 8,217,756 B2 * | 7/2012 | Kumar et al. | 340/5.92 | |
| 8,245,149 B2 * | 8/2012 | Ito | G06F 3/1204 | 358/1.15 |
| 8,384,941 B2 * | 2/2013 | Ciriza | G06F 1/3203 | 358/1.15 |
| 8,488,144 B2 * | 7/2013 | Fujimori et al. | 358/1.15 | |
| 8,694,916 B2 * | 4/2014 | Sohn | H04M 1/72547 | 715/808 |
| 8,775,947 B2 * | 7/2014 | Martinez et al. | 715/748 | |
| 8,788,947 B2 * | 7/2014 | Putz et al. | 715/748 | |
| 8,966,386 B2 * | 2/2015 | Fok et al. | 715/769 | |
| 9,013,264 B2 * | 4/2015 | Parshionikar | G08B 21/06 | 340/3.1 |
| 2002/0049978 A1 * | 4/2002 | Rodriguez | G06F 3/0486 | 725/86 |
| 2002/0054322 A1 * | 5/2002 | Geelen | G06F 3/1207 | 358/1.15 |
| 2002/0141803 A1 * | 10/2002 | Arnold et al. | 400/103 | |
| 2002/0163662 A1 * | 11/2002 | Kaufman et al. | 358/1.14 | |
| 2002/0165784 A1 * | 11/2002 | Taggart | G06Q 30/02 | 705/26.43 |
| 2002/0171681 A1 * | 11/2002 | Nomura | H04N 1/00411 | 715/772 |
| 2003/0103235 A1 * | 6/2003 | Gomi | G06F 3/1229 | 358/1.15 |
| 2003/0161641 A1 * | 8/2003 | Edmonds | G06F 3/121 | 399/23 |
| 2003/0197883 A1 * | 10/2003 | Lay et al. | 358/1.13 | |
| 2004/0003398 A1 * | 1/2004 | Donian | G06F 21/10 | 725/34 |
| 2004/0021899 A1 * | 2/2004 | Jost | G06F 3/16 | 358/1.15 |
| 2004/0125145 A1 * | 7/2004 | Sano | G06F 3/0486 | 715/771 |
| 2004/0190057 A1 * | 9/2004 | Takahashi et al. | 358/1.15 | |
| 2005/0149726 A1 * | 7/2005 | Joshi et al. | 713/164 | |
| 2005/0198223 A1 * | 9/2005 | Fujinawa | G06F 3/121 | 709/220 |
| 2005/0280838 A1 * | 12/2005 | Kanai et al. | 358/1.1 | |
| 2006/0047789 A1 * | 3/2006 | Kumar et al. | 709/220 | |
| 2006/0085758 A1 * | 4/2006 | Backus | 715/772 | |
| 2006/0111092 A1 * | 5/2006 | Harris et al. | 455/418 | |
| 2006/0152759 A1 * | 7/2006 | Chen | G06F 3/1207 | 358/1.15 |
| 2006/0184818 A1 * | 8/2006 | Fujinawa | G06Q 30/00 | 714/4.1 |
| 2006/0248476 A1 * | 11/2006 | Yamada | G06F 3/1205 | 715/835 |
| 2007/0086052 A1 * | 4/2007 | Furuya | H04L 67/16 | 358/1.15 |
| 2007/0174768 A1 * | 7/2007 | Sen et al. | 715/700 | |
| 2007/0216938 A1 * | 9/2007 | Tomita | 358/1.15 | |
| 2007/0229895 A1 * | 10/2007 | Fujimori | G06F 3/1208 | 358/1.16 |
| 2008/0031639 A1 * | 2/2008 | Knodt et al. | 399/8 | |
| 2008/0100869 A1 * | 5/2008 | Nagai | G06K 15/02 | 358/1.18 |
| 2008/0201617 A1 * | 8/2008 | Ohara | G06F 3/04847 | 714/57 |
| 2009/0086266 A1 * | 4/2009 | Nakashima | G06K 15/02 | 358/1.15 |
| 2009/0213086 A1 * | 8/2009 | Chae | G06F 3/0482 | 345/173 |
| 2010/0017734 A1 * | 1/2010 | Cummins et al. | 715/769 | |
| 2010/0157368 A1 * | 6/2010 | Harmon | G06F 3/1204 | 358/1.15 |
| 2010/0214571 A1 * | 8/2010 | Luo | 358/1.1 | |
| 2011/0069353 A1 * | 3/2011 | Sawayanagi et al. | 358/1.16 | |
| 2011/0099497 A1 * | 4/2011 | Fok et al. | 715/769 | |
| 2011/0199645 A1 * | 8/2011 | Ito | G06F 3/121 | 358/1.15 |
| 2011/0260997 A1 * | 10/2011 | Ozaki | G06F 1/1618 | 345/173 |
| 2012/0066602 A1 * | 3/2012 | Chai et al. | 715/733 | |
| 2012/0120133 A1 * | 5/2012 | Gold et al. | 347/7 | |
| 2012/0185789 A1 * | 7/2012 | Louch | G06F 3/0488 | 715/769 |
| 2012/0218596 A1 * | 8/2012 | Hashimoto | G06F 3/1207 | 358/1.15 |
| 2012/0311493 A1 * | 12/2012 | Sohn | H04M 1/72547 | 715/808 |
| 2013/0007647 A1 * | 1/2013 | Kamiyama | G06F 3/0486 | 715/769 |
| 2013/0042183 A1 * | 2/2013 | Martinez et al. | 715/748 | |
| 2013/0042259 A1 * | 2/2013 | Urbach | 719/329 | |
| 2013/0057885 A1 * | 3/2013 | Minowa | 358/1.9 | |
| 2013/0139074 A1 * | 5/2013 | Ozaki | G06F 1/1618 | 715/761 |
| 2013/0174070 A1 * | 7/2013 | Briand | G06F 3/0486 | 715/769 |
| 2013/0185665 A1 * | 7/2013 | Furukawa | G06F 3/0486 | 715/765 |
| 2014/0006600 A1 * | 1/2014 | Hong | G06F 9/542 | 709/224 |
| 2014/0040803 A1 * | 2/2014 | Briand | G06F 3/0486 | 715/769 |
| 2014/0282072 A1 * | 9/2014 | Martinez | G06F 3/0486 | 715/748 |

(56) References Cited

U.S. PATENT DOCUMENTS

| | | | | |
|---|---|---|---|---|
| 2014/0372926 A1* | 12/2014 | Szeto | ............................ | 715/769 |
| 2015/0126175 A1* | 5/2015 | Fok | ....................... | G06F 3/0486 |
| | | | | 455/419 |
| 2016/0219159 A1* | 7/2016 | Iezaki | ................. | H04N 1/00129 |
| 2016/0318312 A1* | 11/2016 | Hedberg | .................... | B41J 3/46 |
| 2017/0060506 A1* | 3/2017 | Krikke | .................. | G06F 3/1205 |
| 2017/0289380 A1* | 10/2017 | Oguchi | ................. | G06F 3/1219 |
| 2018/0007229 A1* | 1/2018 | Adachi | .............. | H04N 1/32662 |
| 2018/0039609 A1* | 2/2018 | Berkland | .............. | G06F 17/243 |
| 2018/0143795 A1* | 5/2018 | Masuzawa | ............ | G06F 3/1204 |

* cited by examiner

IMAGE FORMING APPARATUS

This application claims priority under 35 U.S.C. § 119 to Japanese Patent Application No. 2012-006611 filed on Jan. 16, 2012, the entire disclosure of which is incorporated herein by reference in its entirety.

BACKGROUND OF THE INVENTION

Field of the Invention

The present invention relates to image forming apparatuses such as multifunction peripheral (MFP) also referred to as copiers, printers, and multifunctional digital machines.

Description of the Related Art

The following description sets forth the inventor's knowledge of related art and problems therein and should not be construed as an admission of knowledge in the prior art.

There is a technique which allows users to perform a particular operation on a personal computer for example, by dragging and dropping an icon to another icon on a screen of the personal computer, which has been commonly known. For example, Japanese Unexamined Patent Publication No. 2000-187564 discloses a data processing apparatus which, when an instruction to print a document is given by a drag-and-drop operation, detects that an icon overlaps with another icon, then captures components of a periphery machine (printer) to display.

On the basis of the disclosed technique, suggested is an image forming apparatus such as a MFP, which allows users to perform such an intuitive operation via an operation panel of the image forming apparatus itself.

Usually, an image forming apparatus has events such as paper jams and an empty paper tray, which occur to the body of the image forming apparatus itself. When having such an event, in general, an image forming apparatus displays an alert screen matching this event, on an operation panel of the image forming apparatus itself.

When an event that users would need to be notified of occurs, the current screen in view is interrupted by appearance of such an alert screen. An alert screen may appear during a drag-and-drop operation on a screen, which could cause some inconveniences as follows.

That is, an alert screen, which appears during a drag-and-drop operation on a screen because of occurrence of an event on the body of the image forming apparatus, is usually too large in comparison to the size of the display and thus could occupy most of the surface of the display, interrupting users all on a sudden to perform their operations. In this situation, users have to start this drag-and-drop operation all over again after disappearance of the alert screen, which is troublesome.

In another case, an alert screen, which appears almost at the end of the icon connecting operation by a drag-and-drop operation, could confuse users because they hardly can confirm that a particular operation associated with completion of the icon connecting operation has successfully been completed even after disappearance of the alert screen, which is also an unsolved problem.

In order to solve this, a confirmation screen with a notice of that may be displayed on the operation panel every time a particular operation associated with completion of the icon connecting operation is successfully completed. However, in this situation, users would have to see a confirmation screen even without occurrence of any event, which is still troublesome.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image forming apparatus comprising:

a display portion which allows users to connect a first icon to a second icon by specifying the first icon and moving it to the second icon on a first screen and is capable of displaying the first screen with a still image of the first icon in motion on the way to the second icon and a second screen matching an event that occurs to the body of the image forming apparatus;

a connection completion detector which detects completion of the icon connecting operation;

a processor which performs an operation predetermined for the first icon and the second icon when completion of the icon connecting operation is detected by the connection completion detector;

an event detector which detects occurrence of an event on the body of the image forming apparatus during the icon connecting operation; and a controller which performs, if occurrence of an event on the body of the image forming apparatus is detected by the event detector before completion of the icon connecting operation is detected by the connection completion detector, a first control operation consisting of:

storing on a memory, composition information of the first screen with a still image of the first icon in motion on the way to the second icon;

interrupting the first screen by making the second screen appear on the display; and reproducing the first screen on the display portion after disappearance of the second screen on the basis of the composition information stored on the memory, in order for users to resume the icon connecting operation.

A second aspect of the present invention relates to an image forming apparatus comprising:

a display portion which allows users to connect a first icon to a second icon by specifying the first icon and moving it to the second icon on a first screen and is capable of displaying the first screen with a still image of the first icon in motion on the way to the second icon and a second screen matching an event that occurs to the body of the image forming apparatus;

a connection completion detector which detects completion of the icon connecting operation;

a processor which performs an operation predetermined for the first icon and the second icon when completion of the icon connecting operation is detected by the connection completion detector;

an event detector which detects occurrence of an event on the body of the image forming apparatus during the icon connecting operation;

a controller which performs, if occurrence of an event on the body of the image forming apparatus is detected by the event detector before completion of the icon connecting operation is detected by the connection completion detector, a control operation consisting of:

continuously displaying the first screen on the display portion until completion of the icon connecting operation is detected by the connection completion detector; and making the second screen appear on the display portion after completion of the icon connection operation is detected by the connection completion detector.

A third aspect of the present invention relates to an image forming apparatus comprising:

a display portion which allows users to connect a first icon to a second icon by specifying the first icon and moving it to the second icon on a first screen and is capable of displaying the first screen with a still image of the first icon in motion on the way to the second icon and a second screen matching an event that occurs to the body of the image forming apparatus;

a connection completion detector which detects completion of the icon connecting operation;

a processor which performs an operation predetermined for the first icon and the second icon when completion of the icon connecting operation is detected by the connection completion detector;

an event detector which detects occurrence of an event on the body of the image forming apparatus during the icon connecting operation;

a judgment portion which judges whether or not the first icon has been moved to an area adjacent to the second icon, the adjacent area being specified in advance;

a mode setting portion which allows users to select any one of the interrupt mode, the user operation first mode, and the switch back and forth mode and turns on the selected mode; and a controller which performs:

if occurrence of an event on the body of the image forming apparatus is detected by the event detector during the interrupt mode which is turned on by the mode setting portion, before completion of the icon connecting operation is detected by the connection completion detector, a first control operation consisting of:

storing on a memory, composition information of the first screen with a still image of the first icon in motion on the way to the second icon;

interrupting the first screen by making the second screen appear on the display portion; and reproducing the first screen on the display portion after disappearance of the second screen on the basis of the composition information stored on the memory, in order for users to resume the icon connecting operation;

if occurrence of an event on the body of the image forming apparatus is detected by the event detector during the user operation first mode which is turned on by the mode setting portion, after completion of the icon connecting operation is detected by the connection completion detector, a second control operation consisting of:

continuously displaying the first screen on the display until completion of the icon connecting operation is detected by the connection completion detector; and making the second screen appear on the display after completion of the icon connecting operation is detected by the connection completion detector;

if occurrence of an event on the body of the image forming apparatus is detected by the event detector during the switch back and forth mode which is turned on by the mode setting portion, before the first icon has been moved to the adjacent area according to the judgment portion, a third control operation consisting of:

storing on a memory, composition information of the first screen with a still image of the first icon in motion on the way to the second icon;

interrupting the first screen by making the second screen appear on the display portion; and reproducing the first screen on the display portion after disappearance of the second screen on the basis of the composition information stored on the memory, in order for users to resume the icon connecting operation;

if occurrence of an event on the body of the image forming apparatus is detected by the event detector after the first icon has been moved to the adjacent area according to the judgment portion but before completion of the icon connecting operation is detected by the connection completion detector, a fourth control operation consisting of:

continuously displaying the first screen on the display portion until completion of the icon connecting operation is detected by the connection completion detector; and making the second screen appear on the display after completion of the icon connecting operation is detected by the connection completion detector.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, an embodiment of the present invention will be described with reference to the accompanying drawings.

Figure 1:
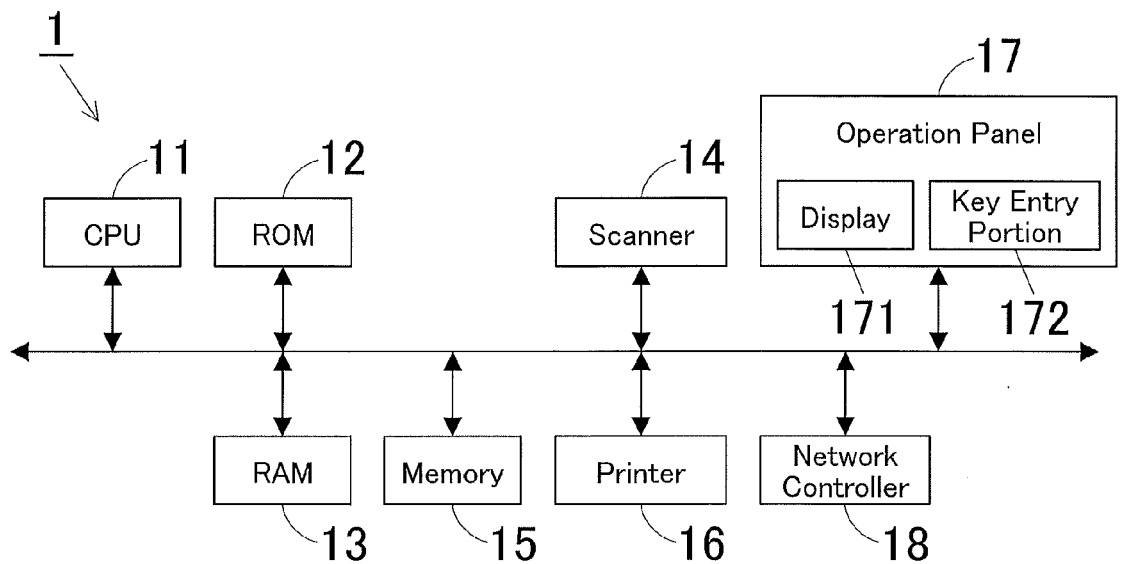
FIG. 1 is a block diagram illustrating a configuration of an image forming apparatus according to one embodiment of the present invention.

FIG. 1 is a block diagram illustrating a configuration of an image forming apparatus 1 according to one embodiment of the present invention. In this embodiment, the image forming apparatus 1 is composed of a MFP which is referred to as a multifunctional digital image forming apparatus collectively having various functions such as copier function, printer function, facsimile function, and scanner function, as described above.

As illustrated in FIG. 1, the image forming apparatus 1 is provided with a CPU 11, a ROM 12, a RAM 13, a scanner 14, a memory 15, a printer 16, an operation panel 17, a network controller (NIC) 18, and the like.

The CPU 11 enables the basic functions such as copier function, printer function, scanner function, and facsimile function by controlling the image forming apparatus 1 in a unified and systematic manner. In addition to these, in this embodiment, the CPU 11 performs various operations as to be described below. That is, when a first icon is connected to a second icon, i.e., when a user moves a first icon to a second icon on a display 171 of the operation panel 17, for example by a drag-and-drop operation, the CPU 11 makes the display 171 to display a first screen with a still image of the first icon in motion on the way to the second icon. When an event occurs to the body of the image forming apparatus 1, the CPU 11 makes the display 171 to display a second screen matching this event. Events that occur to the body of the image forming apparatus 1 are paper jams and an empty tray, for example. When a paper jam or an empty tray occurs, the CPU 11 makes the display 17 to display an alert screen for users to solve this trouble. When an event occurs to the body of the image forming apparatus 1 during the motion of the first icon, the CPU 11 also performs a control operation which will be later described.

The ROM 12 is a memory which stores operation programs and the like for the CPU 21.

The RAM 13 provides a work area for the CPU 21 to execute processing according to an operation program.

The scanner 14 reads images from a document placed on the document glass (not illustrated in this Figure) so as to output image data.

The memory 15, which is composed of a nonvolatile recording device such as a hard disk drive (HDD), stores various applications, image data read out from a document by the scanner 14, and other data.

The printer 16 prints out image data read out from a document by the scanner 14, print data received from the user terminal 2, and the like according to a specified mode.

The operation panel 17, which is used for various entry operations, is provided with: a display 171 composed of a liquid crystal display with touch-panel functionality, displaying messages, operation screens, and the like; and a key entry portion 172 including numeric keys, a Start key, a Stop key, and the like.

The network controller 18 transmits and receives data by controlling communications with other image processing apparatuses, other external devices such as user terminals, and the like on the network.

Figure 2:
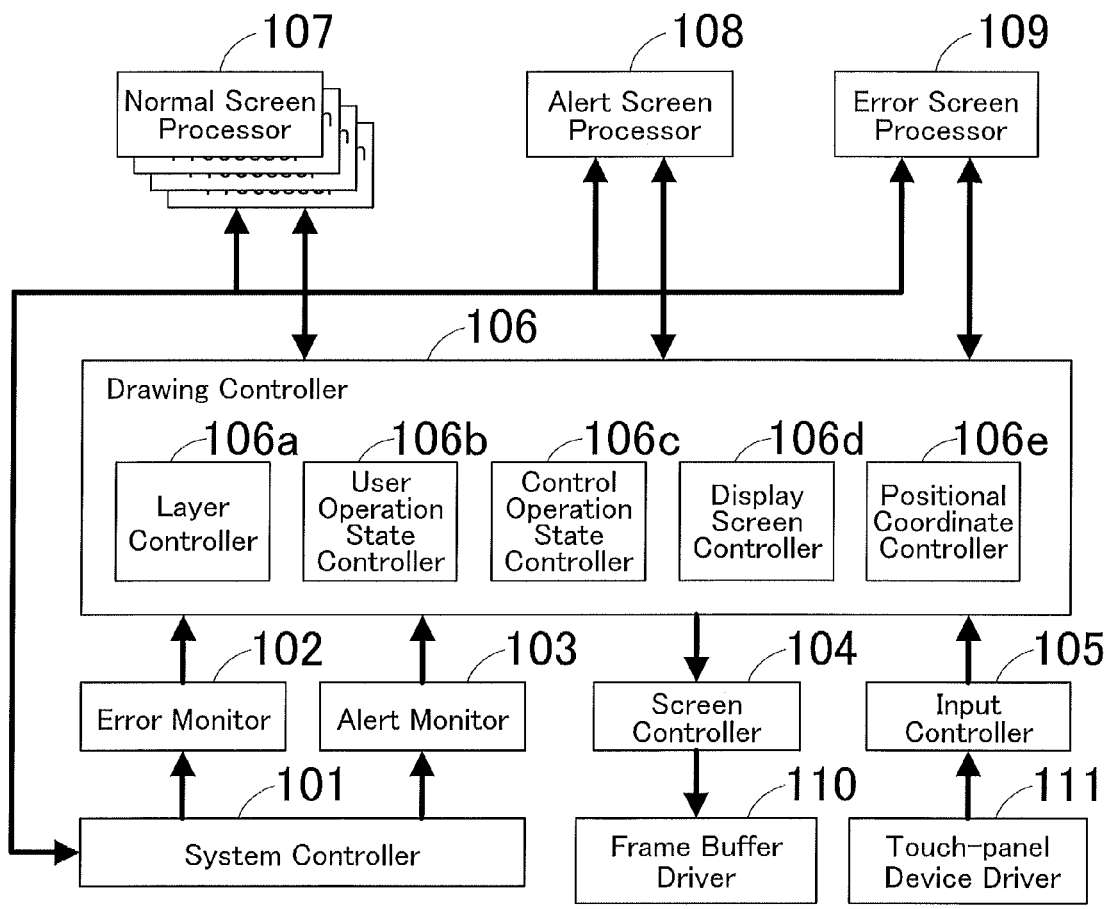
FIG. 2 is a block diagram illustrating a functional configuration of a control system of the image forming apparatus.

FIG. 2 is a block diagram illustrating a functional configuration of a control system of the image forming apparatus 1, which includes: a system controller 101, an error monitor 102, an alert monitor 103, a screen controller 104, an input controller 105, a drawing controller 106, a normal screen processor 107, an alert screen processor 108, an error screen processor 109, a frame buffer driver 110, and a touch-panel device driver 111, and the like.

The CPU 101 controls the entire image forming apparatus 1. The error monitor 102 monitors to detect if an event such as a paper jam occurs to the image forming apparatus 1; the alert monitor 103 monitors to detect if an event such as an empty tray occurs to the image forming apparatus 1 so that an alert could be issued. The screen controller 104 controls display screens, i.e., obtains right screens from the frame buffer driver 110 to display on the display 117. The input controller 105 performs processing on signals inputted via the touch-panel device driver 111 by operating the touch panel of the display 171.

The drawing controller 106 is provided with: a layer controller 106a, a user operation state controller 106b, a control operation state controller 106c, a display screen controller 106d, and a positional coordinate controller 106e.

When an icon starts moving by a drag-and-drop operation, the layer controller 106a draws an image of the icon in motion on a drawing layer other than a base screen, on the basis of the positional coordinate of the icon which is inputted from the input controller 105. The base screen with the drawing layer being put thereon is displayed on the display 171, making the icon in motion visible.

The user operation state controller 106b controls the state of user operations with the image forming apparatus 1; the control operation state controller 106c controls the state of operations of the image forming apparatus 1; the display screen controller 106d makes the display 171 to display a suitable screen based on the state of user operations or the state of operations of the image forming apparatus 1.

The positional coordinate controller 106e stores the positional coordinate of icons and other objects on screens to provide information for the judgment whether or not an icon overlaps with another icon by a drag-and-drop operation.

The normal screen processor 107 produces normal screens to be displayed on the display 171 during a normal operation; the alert screen processor 108 produces alert screens when an event that users would need to be notified of (an empty paper tray, for example) occurs to the image forming apparatus 1. The error screen processor 109 produces error screens when an event that users would need to be notified of (a paper jam, for example) occurs to the image forming apparatus 1.

Hereinafter, operations of the image forming apparatus 1 of FIG. 1 during a drag-and-drop operation starting with touching (specifying) an icon on a screen, i.e., how to display an error or alert screen (also referred to as a second screen) on the display 171 if the image forming apparatus 1 has an event not caused by user operation such as a paper jam or an empty paper tray while displaying a screen with a still image an icon in motion on the way to another icon (also referred to as a first screen) on the display 171, will be described.

Figure 3:
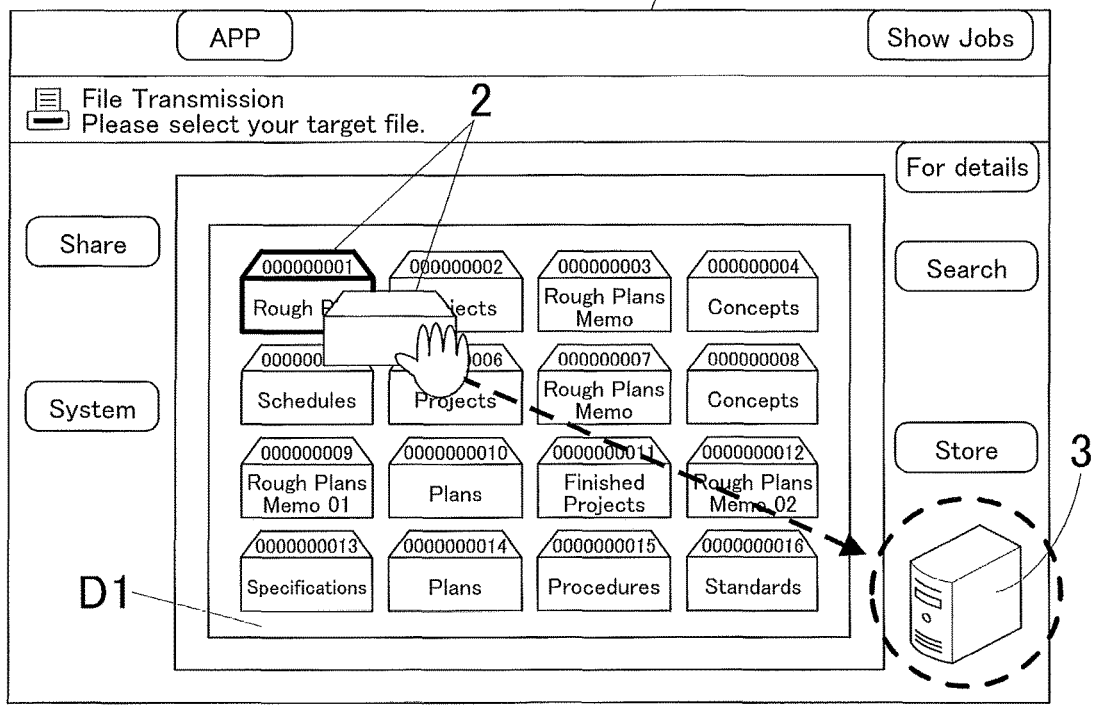
FIG. 3 is a first screen with a still image of a first icon in motion on the way to a second icon.

FIG. 3 is a screen with a plurality of icons representing a plurality of files to be uploaded and an icon representing a file server to which a file is to be uploaded, which is displayed on the display 171. In this example, one of these file icons is connected to the server icon by a drag-and-drop operation.

[1] Interrupt Mode

In this mode, the first screen is interrupted by appearance of the second screen, then reproduced on the display after disappearance of the second screen disappears because of resolution of an error.

FIG. 3 is a first screen D1 with a still image of a target file icon 2 in motion on the way to a server icon 3, which is displayed when a user specifies the file icon 2 by touching it and moves it to the server icon 3 as indicated by an arrow.

Figure 4:
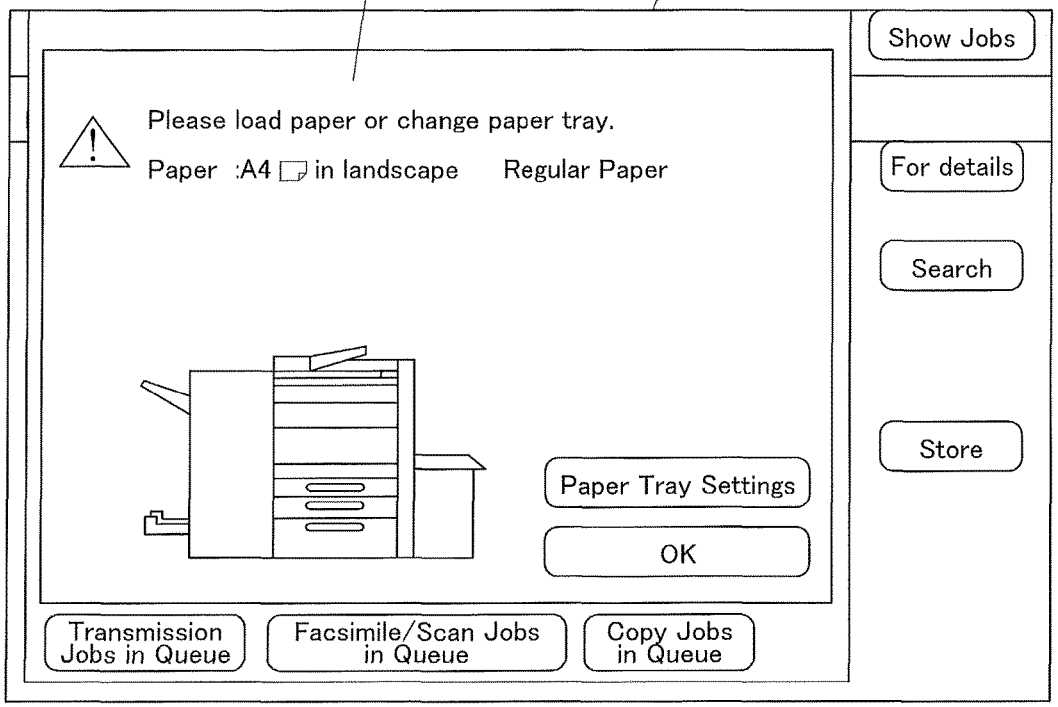
FIG. 4 is one example of a screen which is displayed on the display when an event occurs to the body of the image forming apparatus.

If an event not caused by user operation such as an empty paper tray occurs in this situation, the first screen D1 is interrupted by appearance of a second screen D2 which is an alert screen matching this event, as illustrated in FIG. 4.

Meanwhile, whether or not the file icon 2 finishes moving to the server icon 3 is examined. If the file icon 2 does not finish moving, composition information of the first screen D1 which has been interrupted is stored on the RAM 3 for example. In other words, if occurrence of such an event is detected in that situation, in addition to information of the base screen, the file icon 2 in motion and the positional coordinate of the file icon 2 on a drawing layer are stored on a predetermined memory area of the RAM 3 as objects (screen composition information) according to information stored on the drawing controller 106.

Using the objects stored on the RAM 3, the first screen D1 can be reproduced in order for users to resume the unfinished operation, which will be further described below.

Whether or not the file icon 2 finishes moving to the server icon 3 depends on whether or not dropping the file icon 2 to the server 3 is detected. If the file icon 2 finishes moving, the file represented by the file icon 2 is automatically transmitted to the file server.

Figure 5:
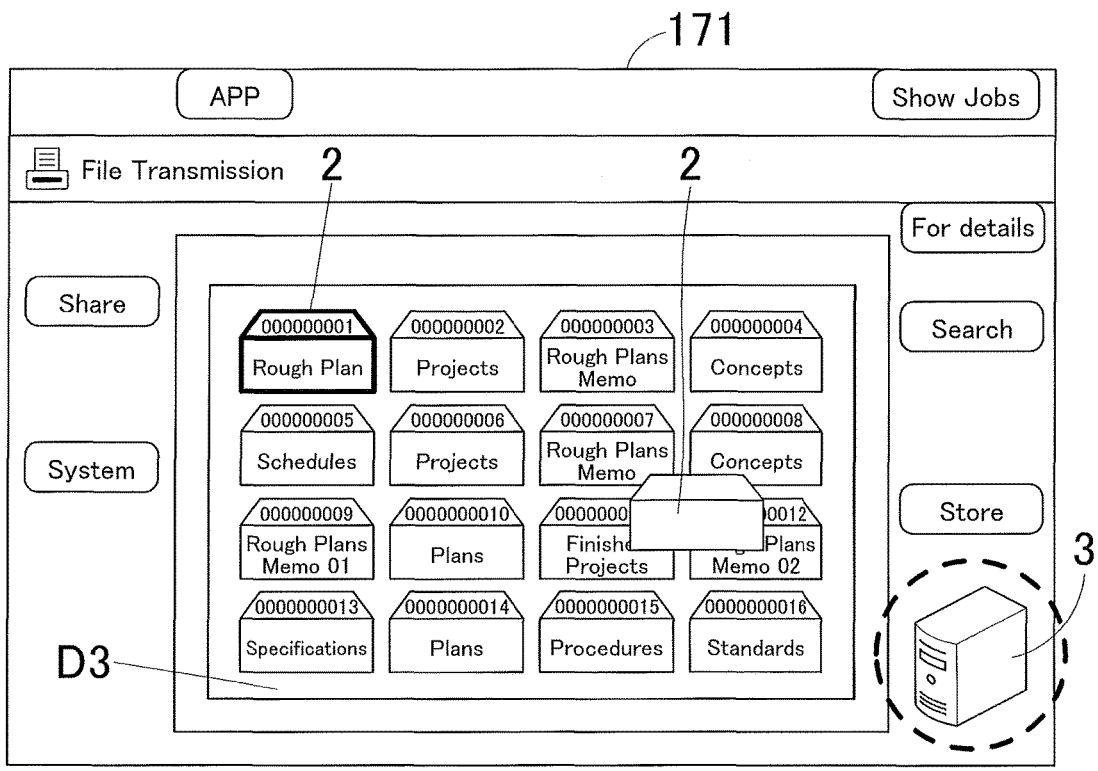
FIG. 5 is the first screen which is reproduced on the display.
Figure 6:
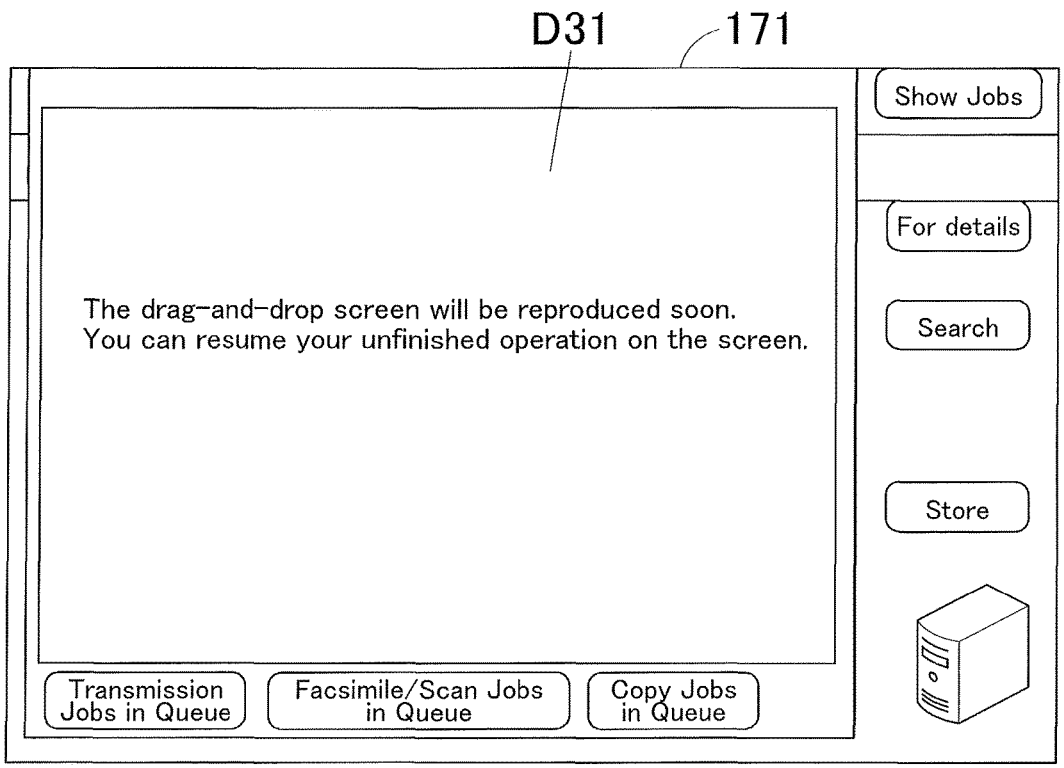
FIG. 6 is a screen which appears on the display right before the first screen is reproduced thereon.

When a user presses the "OK" button on the second screen D2 after loading paper on the empty paper tray, for example, the second screen D2 disappears. If the file icon 2 does not finish moving to the server icon 3 after disappearance of the second screen D2, i.e., after cancellation of the event such as an empty paper tray, a first screen D3 based on the composition information stored on the RAM 3 is displayed on the display 171, as illustrated in FIG. 5. On the basis of the positional coordinate on the drawing layer independent from the base screen, which is stored on the memory, the file icon 2 in motion can properly be positioned on the display 171 without difficulty. Right before the first screen D3, a message screen D31 with a message stating that the first screen will be reproduced soon and the unfinished operation can be resumed on the first screen may be displayed on the display 171, as illustrated in FIG. 6. The message screen D31 displayed on the display 171 allows users to recognize that they can resume the unfinished operation soon on the first screen.

The user then resumes the unfinished drag-and-drop operation to finish it by dropping the file icon 2 to the server icon 3. In order to resume the unfinished operation, the user is required to touch an area in a predetermined range based on the positional coordinate of the file icon 2, after the first screen D3 is displayed on the display 171. Users may stop moving the file icon 2 with pressing a Reset button, by dropping the file icon 2 to a display area which is not an icon, or users may be away without resuming the unfinished operation for more than a predetermined period of time after the first display D3 is displayed. In such a situation, it would be judged that the file icon 2 does not finish moving to the server icon 3 (connecting to the server icon 3), and the first screen D3 thus would not be displayed.

As soon as the file icon 2 is dropped to the sever icon 3, a file representing the file icon 2 is transmitted to the file server.

Figure 7:
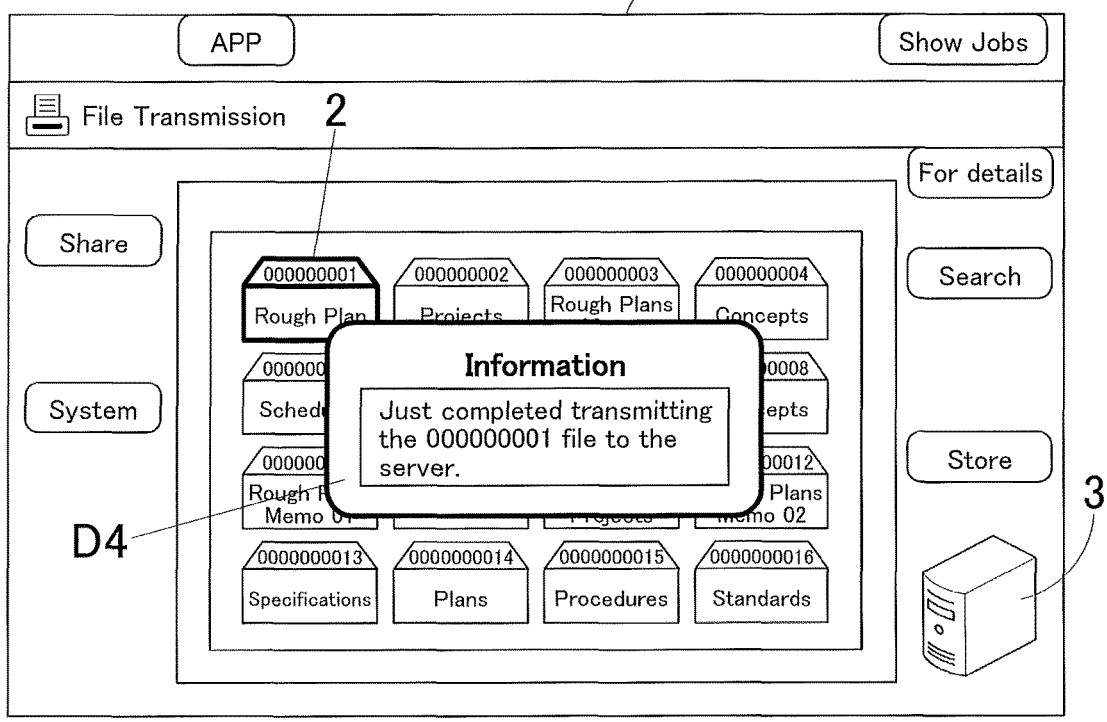
FIG. 7 is a screen with a message stating that a particular operation, which starts when connecting the first icon to the second icon is completed, has successfully been completed.

On the other hand, if an event such as an empty paper tray occurs after the file icon 2 finishes moving, the first screen D3 would not be displayed. In this situation, it is preferred to display on the display 171, a message D4 stating that the file has successfully been transmitted to the file server, after disappearance of the second screen D2, as illustrated in FIG. 7. This allows the user to confirm that he/she has properly completed transmitting the file to the file server.

As described above, in this embodiment, after a user starts dragging the file icon 2: if an event occurs to the body of the image forming apparatus 1 before the file icon 2 finishes moving to the server icon 3, a first screen with a still image of the file icon 2 in motion, which is displayed on the display 171, is interrupted by appearance of a second screen matching the event that occurred. After disappearance of the second screen, the first screen is reproduced on the display on the basis of the composition information stored on the memory, in order for users to resume the unfinished operation, moving the file icon 2 to the sever icon 3.

In other words, if an event that users would need to be notified of occurs to the body of the image forming apparatus 1 during a drag-and-drop operation on a first screen, an alert screen, which interrupts the first screen to appear on the display, allows users to know occurrence of the event; after disappearance of the alert screen, the first screen, which is reproduced on the display along with a still image of the file icon 2 in motion, allows users to resume the unfinished icon connecting operation. Thus this image forming apparatus do not require users to start moving the file icon 2 to the server icon 3 all over again, providing more user-friendly operation interfaces. After disappearance of the alert screen, alternatively, the first screen to be reproduced on the display without a still image of the file icon 2 in motion allows users to confirm that the file has successfully been transmitted to the file server. For more certain confirmation, instead of the first screen, a message stating that the file has successfully been transmitted to the file server may be displayed on the display.

[2] User Operation First Mode

In this mode, a first screen is continuously displayed instead of being interrupted by appearance of a second screen, until the file icon 2 finishes moving to the server icon 3, and the second screen is then displayed after the file icon 2 finishes moving to the server icon 3.

FIG. 3 is a first screen D1 with a still image of the file icon 2 in motion on the way to the server icon 3, which is displayed when a user specifies the file icon 2 by touching it and moves it to the server icon 3 as indicated by an arrow.

If an event not caused by user operation such as an empty paper tray occurs in this situation, composition information of the first screen D1 is stored on the memory, and whether or not the file icon 2 finishes moving to the server icon 3 is examined. If the file icon 2 does not finish moving, the first screen D1 is continuously displayed on the display. If the file icon 2 finishes moving, the file represented by the file icon 2 is transmitted to the file server.

And after the file icon 2 finishes moving, a second screen D2 is displayed on the display 171, as illustrated in FIG. 4. If an event such as an empty paper tray occurs after the file icon 2 finishes moving, the second screen D2 is displayed on the display 171. If a trouble such as no access to the file server occurs even after the file icon 2 finishes moving, a third screen with a notice of that trouble is displayed on the display before appearance of the second screen D2.

As described above, in this embodiment, if an event occurs to the body of the image forming apparatus 1 while the file icon 2 is moving to the server icon 3 by user operation, a first screen with a still image of the file icon 2 in motion is continuously displayed on the display until the file icon 2 finishes moving, then a second screen appears on the display after the file icon 2 finishes moving. In other words, in this embodiment, if an event that users would need to be notified of occurs to the body of the image forming apparatus 1 during a drag-and-drop operation on a first screen, the first screen is continuously displayed on the display until the file icon 2 finishes moving. Thus this image forming apparatus does not require users to start moving the file icon 2 to the server icon 3 all over again, providing more user-friendly operation interfaces. As soon as the file icon 2 finishes moving, the file represented by the file icon 2 is properly transmitted to the file server. This image forming apparatus does not require users neither to confirm whether or not transmission has successfully been completed.

[3] Switch Back and Forth Mode

In this mode, the interrupt mode and the user operation first mode can be turned on back and forth; depending on when an error such as an empty paper tray occurs and the position of the file icon 2, the rush mob first mode and the user operation first mode is turned on back and forth appropriately.

FIG. 3 is a first screen D1 with a still image of the file icon 2 in motion on the way to the server icon 3, which is displayed when a user specifies the file icon 2 by touching it and moves it to the server icon 3 as indicated by an arrow.

Figure 8:
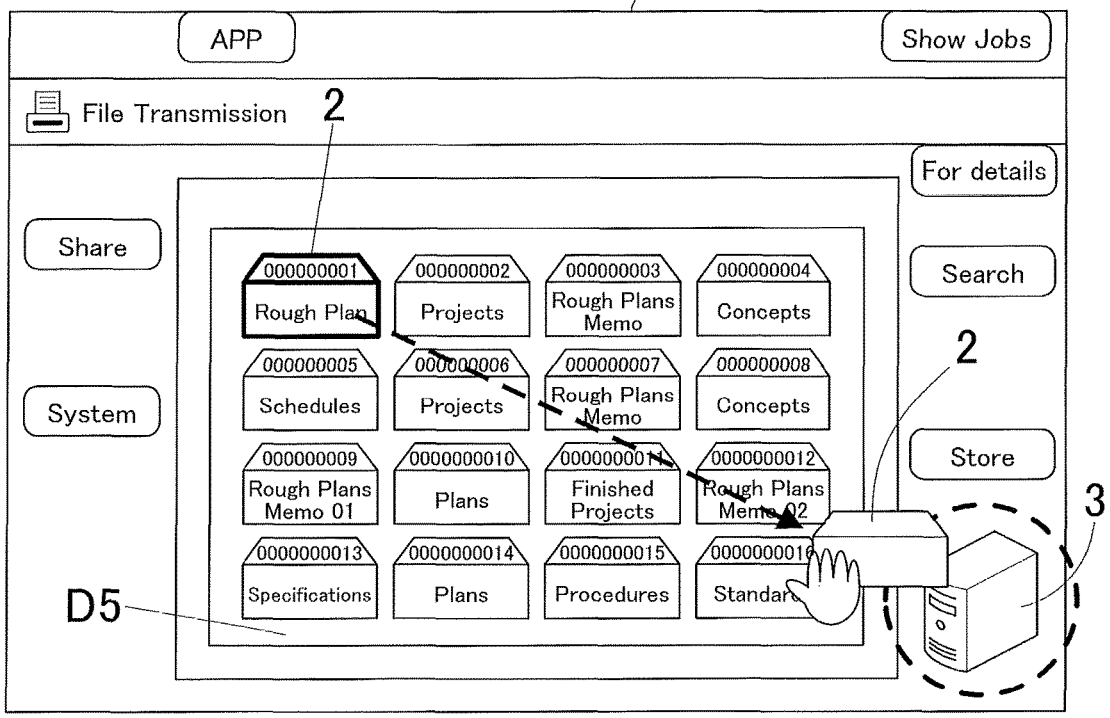
FIG. 8 is a screen which is displayed on the display when the first icon finishes moving to an area adjacent to the second icon.

If an event not caused by user operation such as an empty paper tray occurs in this situation, whether or not the file icon 2 finishes moving to an area adjacent to the server icon 3 is examined. The adjacent area can be specified in advance by an administrator for example. In this embodiment, the file icon 2 overlaps with the server icon 3 at least partially in the adjacent area, as illustrated in a screen D5 of FIG. 8. Whether or not the file icon 2 overlaps with the server icon 3 at least partially in the adjacent area depends on the positional coordinates of the two icons on the screen D5, which can be calculated. If the file icon 2 does not finish moving to the adjacent area to the server icon 3, the operation proceeds in the interrupt mode. That is, the first screen D1 is interrupted by appearance of a second screen D2 matching the event that occurred. Meanwhile, composition information of the first screen D1 which has been interrupted is stored on the memory. When a user presses the "OK" button on the second screen D2 after loading paper on the empty paper tray, for example, the second screen D2 disappears. After disappearance of the second screen D2, i.e., after cancellation of the event such as an empty paper tray, a first screen based on the composition information stored on the RAM 3 is displayed on the display 171, in order for users to resume the unfinished operation, moving the file icon 2 to the adjacent area to the server icon 3.

The user finishes the unfinished operation by dragging and dropping the file icon 2 to the server icon 3. As soon as the file icon 2 is dropped to the server icon 3, the file represented by the file icon 2 is transmitted to the file server.

After the file icon 2 finishes moving to the adjacent area to the server icon 3, the operation proceeds in the user operation first mode. In other words, whether or not the file icon 2 finishes moving to an area adjacent to the server icon 3 is examined, and if the file icon 2 does not finish moving to the adjacent area, the first screen D1 is continuously displayed on the display until the file icon 2 finishes moving. If the file icon 2 finishes moving, the file represented by the file icon 2 is automatically transmitted to the file server. After the file icon 2 finishes moving, the second screen D2 is displayed on the display 171. If an event such as an empty paper tray occurs after the file icon 2 finishes moving to the adjacent area, the second screen D2 is displayed on the display 171.

As described above, in this embodiment, if an event occurs to the body of the image forming apparatus 1 while the file icon 2 is moving to the server icon 3 by user operation, a first screen with a still image of the file icon 2 in motion is continuously displayed on the display or is reproduced on the display on the basis of the position of the file icon 2 after disappearance of a second screen such as an alert screen. Thus this image forming apparatus does not require users to start moving the file icon 2 to the server icon 3 all over again, providing more user-friendly operation interfaces. The image forming apparatus does not require users neither to confirm whether or not a particular operation associated with completion of the icon connecting operation has successfully been completed. More specifically, the file icon 2 may be still away from the server icon 3 (does not still overlap with the server icon 3) shortly after start of dragging, which likely means that the user is simply taking time to find out the server icon 3 on a screen or consider how to do with the file icon 2. In this situation, the interrupt mode allows the user to be immediately aware of urgent and necessary information, as described above.

The file icon 2 also may overlap with the server icon 3, which most likely means that the user is about to finish moving the file icon 2 by dropping the file icon 2 to the server icon 3. In this situation, the user operation first mode allows the user to continue his/her operation that will finish very soon, improving user-friendliness.

As described above, in the switch back and forth mode, the interrupt mode and the user operation first mode can be turned on back and forth appropriately depending on the level of the distance between the file icon 2 and the server icon 3.

[4] Mode Selection

Figure 9:
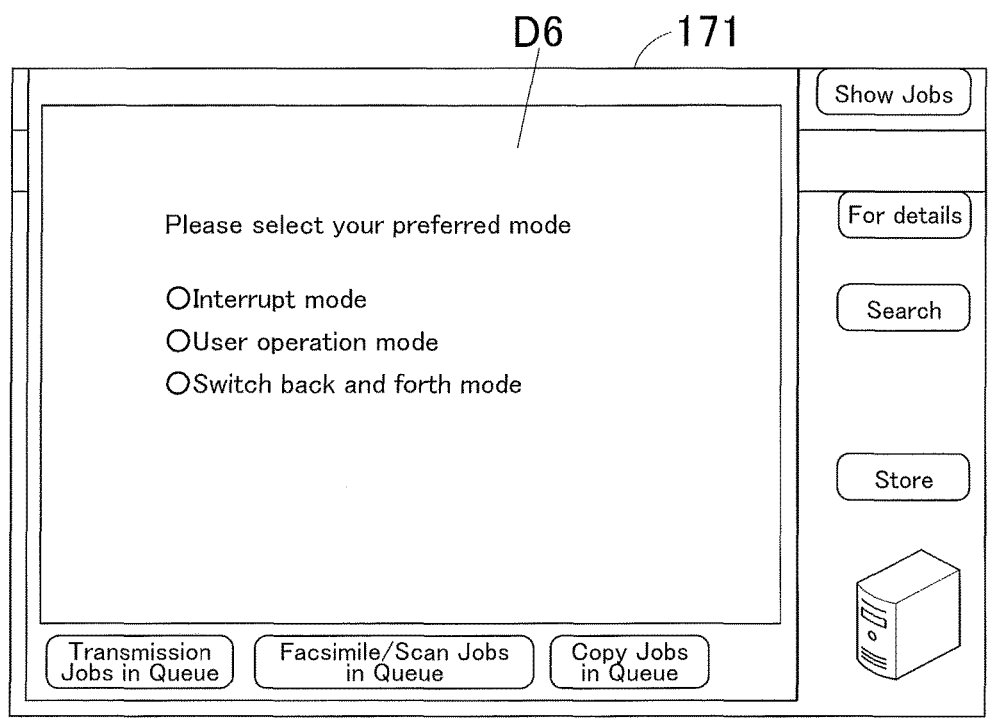
FIG. 9 is a selection screen which allows users to select any one of the interrupt mode, the user operation first mode, and the switch back and forth mode.

In this embodiment, the image forming apparatus 1 has all functions installed thereon to enable the following modes: rush job first, user operation first, and switch back and forth. FIG. 9 is a selection screen D6 which allows users to select any of the modes.

When a user selects one of the modes, the selected mode is turned on by the image forming apparatus 1, and operations are performed in the mode as described above.

Figure 10:
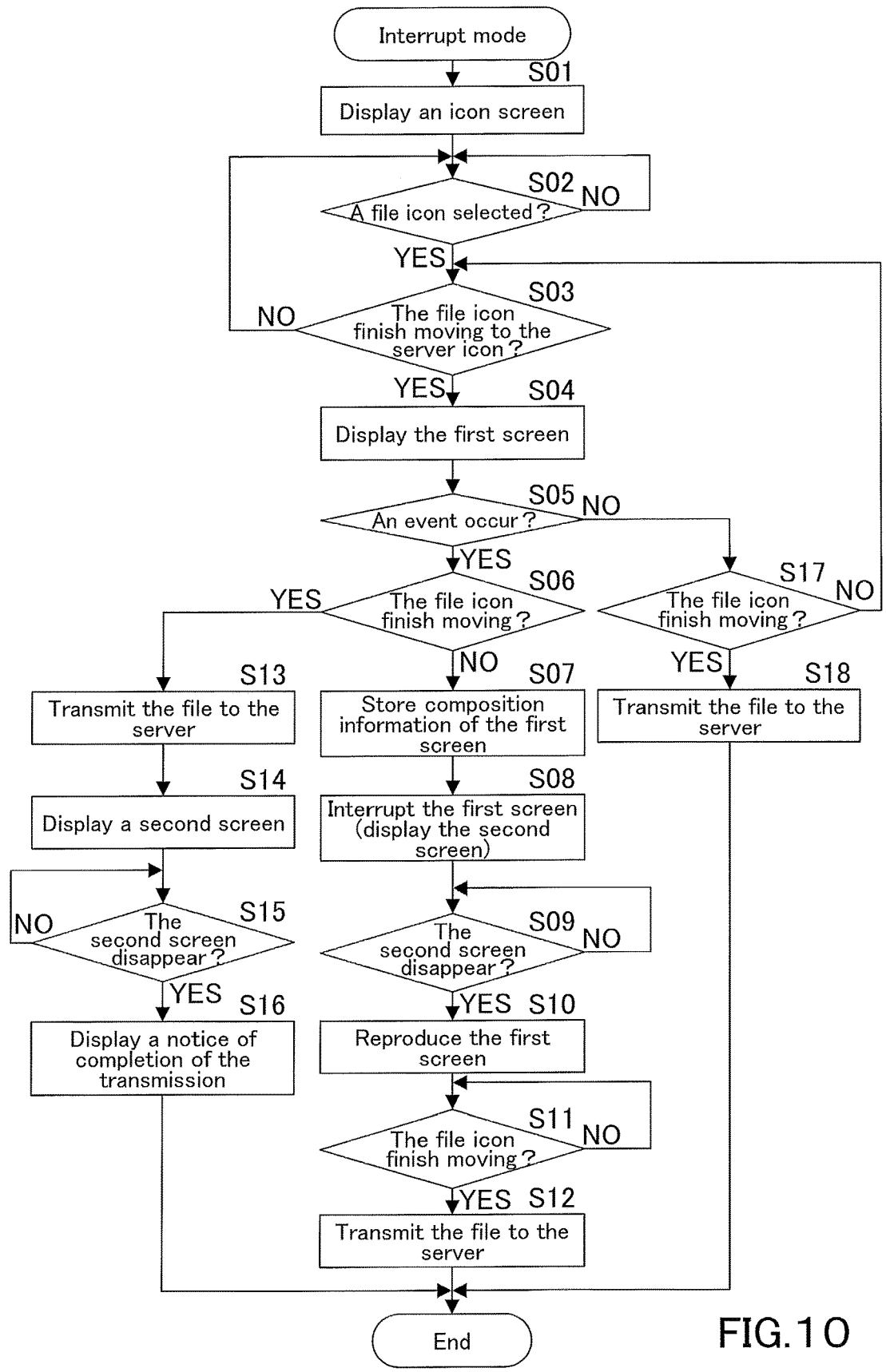
FIG. 10 is a flowchart representing operations of the image processing apparatus in the interrupt mode.

FIG. 10 is a flowchart representing operations of the image forming apparatus 1 in the interrupt mode. These operations are executed by the CPU 11 of the image forming apparatus 1 according to an operation program stored on a recording medium such as the ROM 12 of the image forming apparatus 1.

In Step S01, a screen with a plurality of icons (icon screen) is displayed on the display 171. The routine waits in Step S2 until the file icon 2 is specified (touched) by a user. If the file icon 2 is specified (YES in Step S02), it is judged whether or not the file icon 2 is currently moving (being dragged) in Step S03. If the file icon 2 is not currently moving (NO in Step S03), the routine returns to Step S02. If the file icon 2 is currently moving (YES in Step S03), the first screen D1 with the file icon 2 in motion on the way to the server icon 3 is displayed on the display 171.

Then in Step S05, it is judged whether or not an event such as an empty paper tray occurs. If such an event occurs (YES in Step S05), then it is judged in Step S06 whether or not the file icon 2 finishes moving to the server icon 3.

If the file icon 2 does not finish moving (NO in Step S06), composition information of the first screen D1 is stored on the memory in Step S07. Then in Step S08, the first screen D1 is interrupted by appearance of the second screen D2 which notifies the user of the event.

In Step S09, it is judged whether or not the second screen D2 disappears because of cancellation of the event such as an empty paper tray, for example by loading paper on the empty paper tray. If the second screen D2 does not disappear (NO in Step S09), the routine waits until it disappears. If the second screen D2 disappears (YES in Step S09), a first screen D3 based on the composition information stored on the memory is displayed on the display in Step S10. The user then resumes the unfinished drag-and-drop operation on the first screen D3.

In Step S11, it is judged whether or not the file icon 2 finishes moving to the server icon 3. If the file icon 2 does not finish moving (NO in Step S11), the routine waits until it finishes. If the file icon 2 finishes moving (YES in Step S11), the file represented by the file icon 2 is transmitted to the file server in Step S12, then the routine terminates.

If the file icon 2 finishes moving (YES in Step S06), the file represented by the file icon 2 is transmitted to the file server in Step S13, then the second screen D2 is displayed on the display in Step S14. If an event such as a paper empty tray no sooner occurs than the file icon 2 finishes moving to the server icon 3, the second screen D2 appears on the display very soon, by which they possibly hardly could confirm that transmission has successfully been completed. In order to prevent this, in this situation, the second screen D2 may appear on the display after lapse of a predetermined period of time.

Subsequently, it is judged in Step S15 whether or not the second screen D2 disappears because of cancellation of the event such as an empty paper tray. If the second screen D2 does not disappear (NO in Step S15), the routine waits until it disappear. If the second screen D2 disappears (YES in Step S15), a message stating that transmission to the file server has successfully been completed is displayed on the display 171 in Step S16.

Back to Step S05, if an event such as an empty paper tray occurs (NO in Step S05), it is judged in Step S17 whether or not the file icon 2 finishes moving to the server icon 3. If the file icon 2 does not finish moving (NO in Step S17), the routine returns to Step S03. If the file icon 2 finishes moving (YES in Step S17), the file represented by the file icon 2 is transmitted to the file server in Step S18, then the routine terminates.

Figure 11:
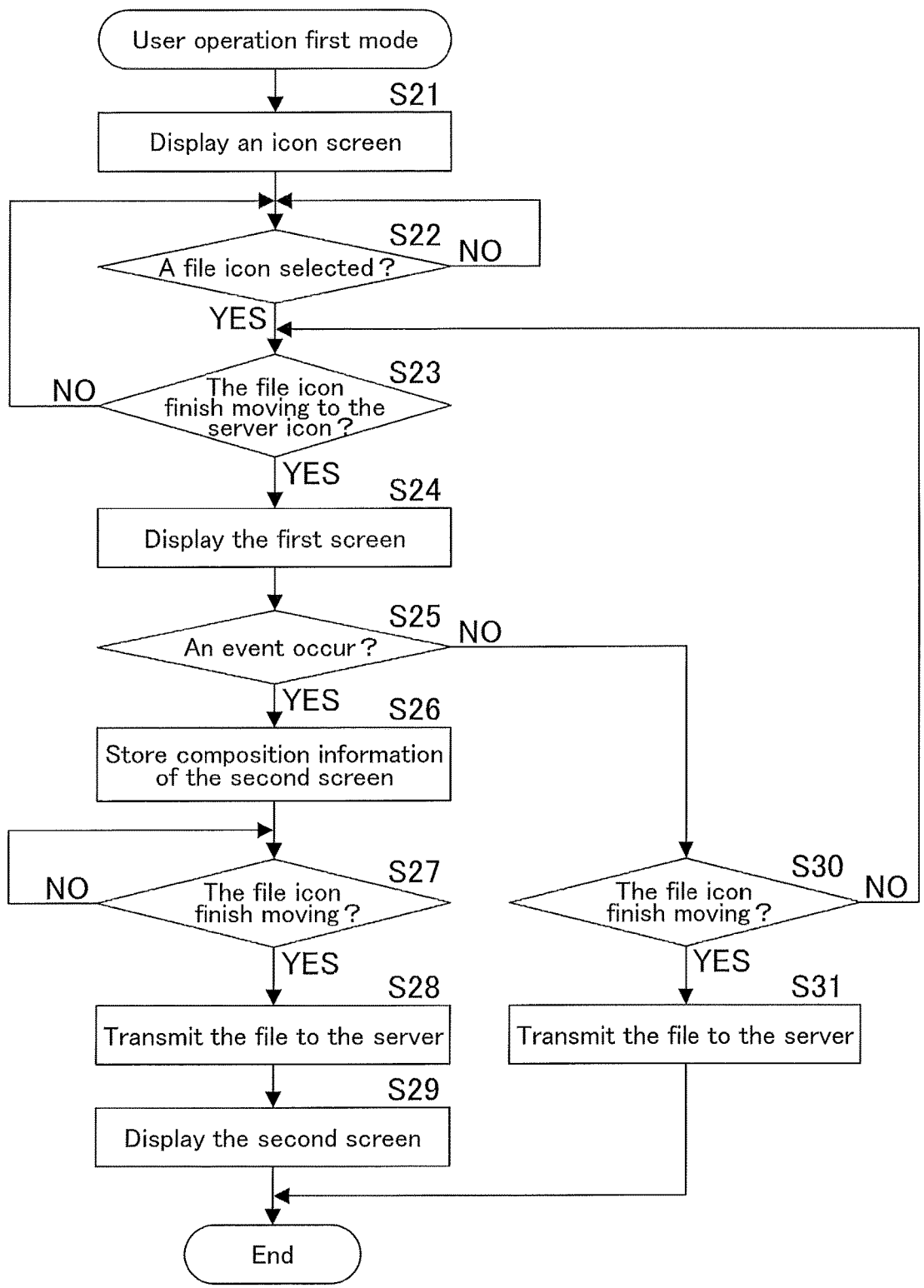
FIG. 11 is a flowchart representing operations of the image processing apparatus in the user operation first mode.

FIG. 11 is a flowchart representing operations of the image forming apparatus 1 in the user operation first mode. These operations are executed by the CPU 11 of the image forming apparatus 1 according to an operation program stored on a recording medium such as the ROM 12 of the image forming apparatus 1.

In Step S21, an icon screen is displayed on the display 171. The routine waits in Step S22 until the file icon 2 is specified (touched) by a user. If the file icon 2 is specified (YES in Step S22), it is judged whether or not the file icon 2 is currently moving (being dragged) in Step S23. If the file icon 2 is not currently moving (NO in Step S22), the routine returns to Step S22. If the file icon 2 is currently moving (YES in Step S23), the first screen D1 with the file icon 2 in motion on the way to the server icon 3 is displayed on the display 171.

Then in Step S25, it is judged whether or not an event such as an empty paper tray occurs. If such an event occurs (YES in Step S25), the second screen D2 does not appear on the display; instead, composition information of the second screen D2 is stored on the memory in Step S26. Then in Step S27, it is judged whether or not the file icon 2 finishes moving to the server icon 3.

If the file icon 2 does not finish moving (NO in Step S27), the routine waits until it finishes. If the file icon 2 finishes moving (YES in Step S27), the file represented by the file icon 2 is transmitted to the file server in Step S28, then the second screen D2 is displayed on the display in Step S29. After that, the routine terminates. The second screen which appears too soon because an event occurs right before or after the file icon 2 finishes moving to the server icon 3 may confuse users because they hardly can confirm that transmission has successfully been completed. In this situation, in order to prevent the user inconvenience, the second screen D2 may appear on the display after lapse of a predetermined period of time.

Back to Step S25, if an event such as an empty paper tray occurs (NO in Step S25), it is judged in Step S30 whether or not the file icon 2 finishes moving to the server icon 3. If the file icon 2 does not finish moving (NO in Step S30), the routine returns to Step S23. If the file icon 2 finishes moving (YES in Step S30), the file represented by the file icon 2 is transmitted to the file server in Step S31, then the routine terminates.

Figure 12:
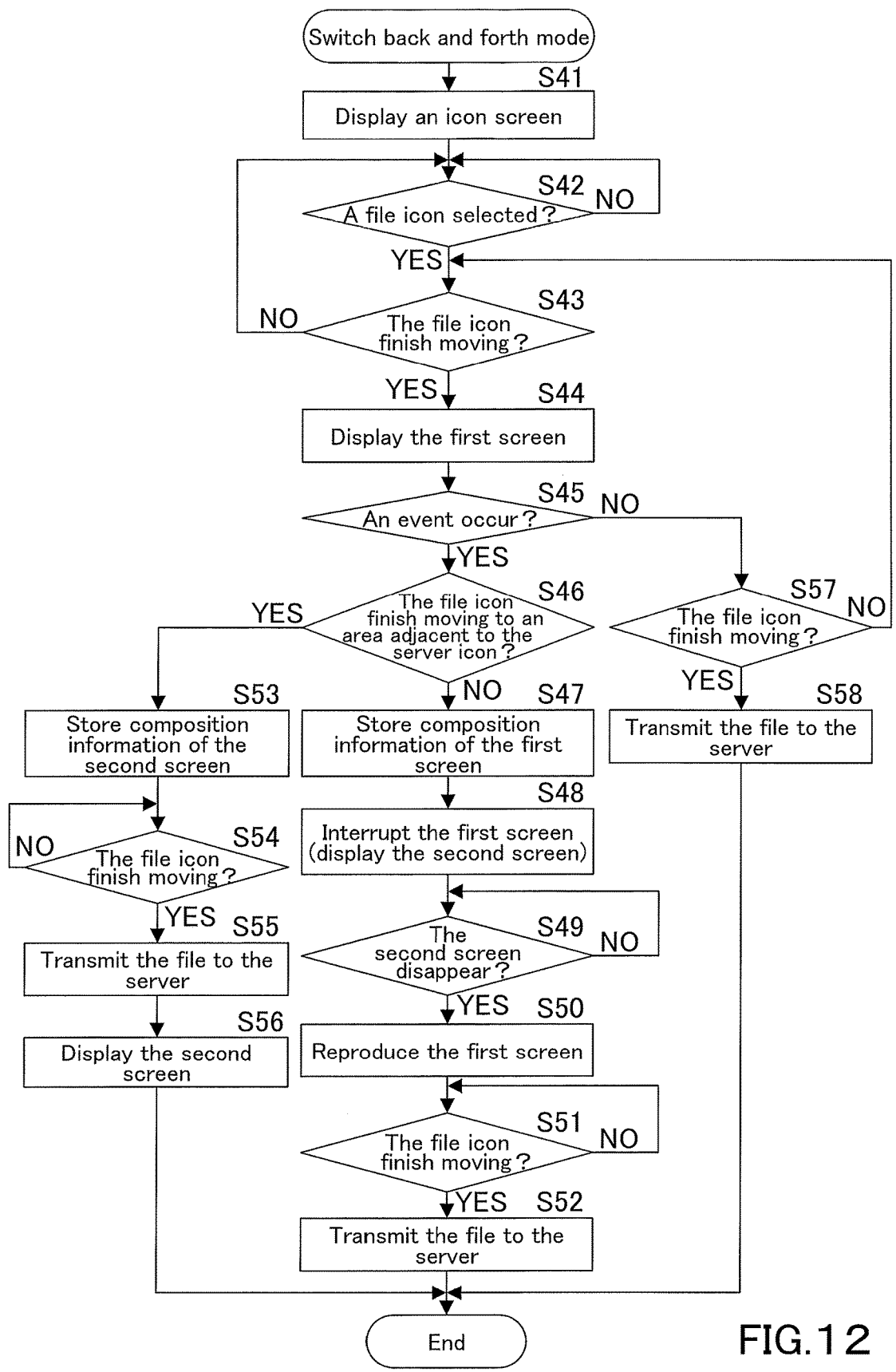
FIG. 12 is a flowchart representing operations of the image processing apparatus in the switch back and forth mode.

FIG. 12 is a flowchart representing operations of the image forming apparatus 1 in the switch back and forth mode. These operations are executed by the CPU 11 of the image forming apparatus 1 according to an operation program stored on a recording medium such as the ROM 12 of the image forming apparatus 1.

In Step S41, an icon screen is displayed on the display 171. The routine waits in Step S42 until the file icon 2 is specified (touched) by a user. If the file icon 2 is specified (YES in Step S42), it is judged whether or not the file icon 2 is currently moving (being dragged) in Step S43. If the file icon 2 is not currently moving (NO in Step S43), the routine returns to Step S42. If the file icon 2 is currently moving (YES in Step S43), the first screen D1 with the file icon 2 in motion on the way to the server icon 3 is displayed on the display 171.

Then in Step S45, it is judged whether or not an event such as an empty paper tray occurs. If such an event occurs (YES in Step S45), then it is judged in Step S46 whether or not the file icon 2 finishes moving to an area adjacent to the server icon 3.

If the file icon 2 does not finish moving to an area adjacent to the sever icon 3 (NO in Step S46), composition information of the first screen D1 is stored on the memory in Step S47. Then in Step S48, the first screen D1 is interrupted by appearance of the second screen D2 which notifies the user of the event.

In Step S49, it is judged whether or not the second screen D2 disappears because of cancellation of the event such as an empty paper tray, for example by loading paper on the empty paper tray. If the second screen D2 does not disappear (NO in Step S49), the routine waits until it disappears. If the second screen D2 disappears (YES in Step S49), a first screen D3 based on the composition information stored on the memory is displayed on the display in Step S50. The user then resumes the unfinished drag-and-drop operation on the first screen D3.

In Step S51, it is judged whether or not the file icon 2 finishes moving to the server icon 3. If the file icon 2 does not finish moving (NO in Step S51), the routine waits until it finishes. If the file icon 2 finishes moving (YES in Step S51), the file represented by the file icon 2 is transmitted to the file server in Step S52, then the routine terminates.

Back to Step S46, if the file icon 2 finishes moving to an area adjacent to the server icon 3 (YES in Step S46), the second screen D2 does not appear on the display; instead, composition information of the second screen D2 is stored on the memory in Step S53. Then in Step S54, it is judged whether or not the file icon 2 finishes moving to the server icon 3.

If the file icon 2 does not finish moving (NO in Step S54), the routine waits until it finishes. If the file icon 2 finishes moving (YES in Step S54), the file represented by the file icon 2 is transmitted to the file server in Step S55, then the second screen D2 is displayed on the display in Step S26. After that, the routine terminates. The second screen which appears too soon because an event occurs right before or after the file icon 2 finishes moving to the server icon 3 may confuse users because they hardly can confirm that transmission has successfully been completed. In this situation, in order to prevent the user inconvenience, the second screen D2 may appear on the display after lapse of a predetermined period of time.

Back to Step S45, if an event such as an empty paper tray occurs (NO in Step S45), it is judged in Step S57 whether or not the file icon 2 finishes moving to the server icon 3. If the file icon 2 does not finish moving (NO in Step S57), the routine returns to Step S43. If the file icon 2 finishes moving (YES in Step S57), the file represented by the file icon 2 is transmitted to the file server in Step S58, then the routine terminates.

Some embodiments of the present invention have been described in the foregoing specification, which does not mean that the present invention shall be construed as limited to the particular forms disclosed.

For example, users connect a file icon to a server icon by a drag-and-drop operation; alternatively users may do it by a pinch-in-and-out operation.

The present invention having been described above may be applied to the following modes.

[1] An image forming apparatus comprising:
a display portion which allows users to connect a first icon to a second icon by specifying the first icon and moving it to the second icon on a first screen and is capable of displaying the first screen with a still image of the first icon in motion on the way to the second icon and a second screen matching an event that occurs to the body of the image forming apparatus;
a connection completion detector which detects completion of the icon connecting operation;
a processor which performs an operation predetermined for the first icon and the second icon when completion of the icon connecting operation is detected by the connection completion detector;
an event detector which detects occurrence of an event on the body of the image forming apparatus during the icon connecting operation; and
a controller which performs, if occurrence of an event on the body of the image forming apparatus is detected by the event detector before completion of the icon connecting operation is detected by the connection completion detector, a first control operation consisting of:
storing on a memory, composition information of the first screen with a still image of the first icon in motion on the way to the second icon;
interrupting the first screen by making the second screen appear on the display; and
reproducing the first screen on the display portion after disappearance of the second screen on the basis of the composition information stored on the memory, in order for users to resume the icon connecting operation.

[2] The image forming apparatus according to the aforementioned mode [1], further comprising a judgment portion which judges whether or not the first icon has been moved to an area adjacent to the second icon, the adjacent area being specified in advance, wherein:
the controller performs, if occurrence of an event on the body of the image forming apparatus is detected by the event detector before the first icon has been moved to the adjacent area according to the judgment portion, a second control operation consisting of:
storing on the memory, composition information of the first screen with an still image of the first icon in motion on the way to the second icon;
interrupting the first screen by making the second screen appear on the display portion; and
reproducing on the display portion, the first screen based on the composition information stored on the memory, after disappearance of the second screen, in order for users to resume the icon connecting operation;
the controller, if occurrence of an event on the body of the image forming apparatus is detected by the event detector after the first icon has been moved to the adjacent area according to the judgment portion but before completion of the icon connecting operation is detected by the connection completion detector, performs a third control operation consisting of:
continuously displaying the first screen on the display portion until completion of the icon connecting operation is detected by the connection completion detector; and
making the second screen appear on the display portion after completion of the icon connection operation is detected by the connection completion detector.

[3] An image forming apparatus comprising:
a display portion which allows users to connect a first icon to a second icon by specifying the first icon and moving it to the second icon on a first screen and is capable of displaying the first screen with a still image of the first icon in motion on the way to the second icon and a second screen matching an event that occurs to the body of the image forming apparatus;
a connection completion detector which detects completion of the icon connecting operation;
a processor which performs an operation predetermined for the first icon and the second icon when completion of the icon connecting operation is detected by the connection completion detector;
an event detector which detects occurrence of an event on the body of the image forming apparatus during the icon connecting operation;
a controller which performs, if occurrence of an event on the body of the image forming apparatus is detected by the event detector before completion of the icon connecting operation is detected by the connection completion detector, a control operation consisting of:
continuously displaying the first screen on the display portion until completion of the icon connecting operation is detected by the connection completion detector; and making the second screen appear on the display portion after completion of the icon connection operation is detected by the connection completion detector.

[4] An image forming apparatus comprising:
a display portion which allows users to connect a first icon to a second icon by specifying the first icon and moving it to the second icon on a first screen and is capable of displaying the first screen with a still image of the first icon in motion on the way to the second icon and a second screen matching an event that occurs to the body of the image forming apparatus;

a connection completion detector which detects completion of the icon connecting operation;

a processor which performs an operation predetermined for the first icon and the second icon when completion of the icon connecting operation is detected by the connection completion detector;

an event detector which detects occurrence of an event on the body of the image forming apparatus during the icon connecting operation;

a judgment portion which judges whether or not the first icon has been moved to an area adjacent to the second icon, the adjacent area being specified in advance;

a mode setting portion which allows users to select any one of the interrupt mode, the user operation first mode, and the switch back and forth mode and turns on the selected mode; and a controller which performs:

if occurrence of an event on the body of the image forming apparatus is detected by the event detector during the interrupt mode which is turned on by the mode setting portion, before completion of the icon connecting operation is detected by the connection completion detector, a first control operation consisting of:

storing on a memory, composition information of the first screen with a still image of the first icon in motion on the way to the second icon;

interrupting the first screen by making the second screen appear on the display portion; and reproducing on the display portion, the first screen based on the composition information stored on the memory, after disappearance of the second screen, in order for users to resume the icon connecting operation;

if occurrence of an event on the body of the image forming apparatus is detected by the event detector during the user operation first mode which is turned on by the mode setting portion, after completion of the icon connecting operation is detected by the connection completion detector, a second control operation consisting of:

continuously displaying the first screen on the display until completion of the icon connecting operation is detected by the connection completion detector; and making the second screen appear on the display after completion of the icon connecting operation is detected by the connection completion detector;

if occurrence of an event on the body of the image forming apparatus is detected by the event detector during the switch back and forth mode which is turned on by the mode setting portion, before the first icon has been moved to the adjacent area according to the judgment portion, a third control operation consisting of:

storing on a memory, composition information of the first screen with a still image of the first icon in motion on the way to the second icon;

interrupting the first screen by making the second screen appear on the display portion; and reproducing on the display portion, the first screen based on the composition information stored on the memory, after disappearance of the second screen, in order for users to resume the icon connecting operation;

if occurrence of an event on the body of the image forming apparatus is detected by the event detector after the first icon has been moved to the adjacent area according to the judgment portion but before completion of the icon connecting operation is detected by the connection completion detector, a fourth control operation consisting of:

continuously displaying the first screen on the display portion until completion of the icon connecting operation is detected by the connection completion detector; and making the second screen appear on the display after completion of the icon connecting operation is detected by the connection completion detector.

[5] The image forming apparatus according to the aforementioned mode [1], wherein, if occurrence of an event on the body of the image forming apparatus is detected by the event detector after completion of the icon connecting operation is detected by the connection completion detector, the controller makes a message stating that the predetermined operation for the first icon and the second icon has successfully been completed, appear on the display portion after disappearance of the second screen.

[6] The image forming apparatus according to the aforementioned mode [2] or [4], wherein the first icon overlaps with the second icon at least partially in the area adjacent to the second icon.

[7] The image forming apparatus according to any one of the aforementioned items [1], [2], and [4] to [6], wherein the controller makes a message stating that the first screen will be reproduced, appear on the display portion before reproducing the first screen thereon.

[8] The image forming apparatus according to any one of the aforementioned modes [1], [2], and [4] to [7], wherein:

the display portion displays the first screen by displaying a base screen with a drawing layer carrying a drawing of the first icon in motion on the way to the second icon, the drawing layer being put on the base screen;

the controller performs a control operation consisting of:

storing on the memory, the positional coordinate of the first icon on the drawing layer;

allowing users to resume the icon connecting operation if an area in a predetermined range based on the positional coordinate of the first icon on the drawing layer is specified by user operation after reproduction of the first screen; and making the first screen disappear from the display portion without completing the icon connecting operation when at least one of the following conditions is satisfied: a) the icon connecting operation is cancelled by user operation; b) the first icon is connected to another object than the second icon; and c) a predetermined period of time has lapsed after reproduction of the first screen.

[9] The image forming apparatus according to the aforementioned mode [3] or [4], wherein, if the predetermined operation for the first icon and the second icon cannot be performed by the processor for some reasons while the first screen is displayed on the display portion before completion of the icon connecting operation is detected by the connection completion detector, the controller makes a third screen with a message stating that the predetermined operation for the first icon and the second icon cannot be performed for some reasons, appear on the display portion.

[10] The image forming apparatus according to any one of the aforementioned modes [1] to [9], wherein users are allowed to connect the first icon to the second icon by dragging and dropping the first icon to the second icon on the first screen.

According to the invention as described in the aforementioned mode [1], after a user starts connecting the first icon to the second icon, if occurrence of an event on the body of the image forming apparatus is detected before completion of the icon connecting operation is detected, composition information of the first screen with a still image of the first icon in motion on the way to the second icon is stored on the memory, and the first screen, which is displayed on the display portion, is interrupted by appearance of the second screen matching the event that occurred. After disappearance of the second screen, the first screen is reproduced on the display portion on the basis of the composition information stored on the memory, in order for users to resume the unfinished icon connecting operation.

In other words, if an event that users would need to be notified of occurs to the body of the image forming apparatus 1 during a drag-and-drop operation on a first screen, an alert screen, which interrupts the first screen to appear on the display portion, allows users to know occurrence of the event; after disappearance of the alert screen, the first screen, which is reproduced on the display portion along with a still image of the file icon 2 in motion, allows users to resume the unfinished icon connecting operation. Thus this image forming apparatus does not require users to start moving the file icon 2 to the server icon 3 all over again, providing more user-friendly operation interfaces. After disappearance of the alert screen, alternatively, the first screen, which is reproduced on the display portion without a still image of the file icon 2 in motion, allows users to confirm that a particular operation associated with completion of the icon connecting operation has successfully been completed.

According to the invention as described in the aforementioned mode [2], after a user starts connecting the first icon to the second icon, if occurrence of an event on the image forming apparatus is detected before the first icon finishes moving to a predetermined area which is adjacent to the second icon, the first screen, which is displayed on the display portion, is interrupted by appearance of the second screen matching the event that occurred, and after disappearance of the second screen, the first screen is reproduced on the display portion in order for users to resume the unfinished icon connecting operation. If occurrence of an event on the image forming apparatus is detected after the first icon finishes moving to a predetermined area which is adjacent to the second icon, the first screen is continuously displayed on the display portion until completion of the icon connecting operation, then the second screen appears on the display portion after completion of the icon connecting operation.

In other words, if an event that users would need to be notified of occurs to the body of the image forming apparatus during a drag-and-drop operation on a first screen, the first screen with a still image of the first icon in motion on the way to the second icon is continuously displayed on the display portion or the same is reproduced on the display portion on the basis of the position of the first icon after disappearance of the second screen such as an alert screen. Thus this image forming apparatus does not require users to start moving the first icon to the second icon all over again, providing more user-friendly operation interfaces. The image forming apparatus does not require users neither to confirm whether or not a particular operation associated with completion of the icon connecting operation has successfully been completed.

According to the invention as described in the aforementioned mode [3], if occurrence of an event on the image forming apparatus is detected before completion of the icon connecting operation is detected, the first screen is continuously displayed on the display portion, then the second screen appears on the display portion after completion of the icon connecting operation is detected.

In other words, if an event that users would need to be notified of occurs to the body of the image forming apparatus during a drag-and-drop operation on a first screen, the first screen with a still image of the first icon in motion on the way to the second icon is continuously displayed on the display portion until completion of the icon connecting operation. Thus this image forming apparatus does not require users to start moving the first icon to the second icon all over again, providing more user-friendly operation interfaces. As soon as the icon connecting operation is completed, a particular operation associated with completion of the icon connecting operation is properly performed. This image forming apparatus does not require users neither to confirm whether or not the particular operation has successfully been completed.

According to the invention as described in the aforementioned mode [4], users are allowed to select any one of the interrupt mode as described in the aforementioned mode [1], the user operation first mode as described in the aforementioned mode [2], and the switch back and forth mode as described in the aforementioned mode [3].

According to the invention as described in the aforementioned mode [5], if occurrence of an event is detected after completion of the icon connecting operation is detected, a message stating that the predetermined operation for the first icon and the second icon has successfully been completed appears on the display portion after disappearance of the second screen.

According to the invention as described in the aforementioned mode [6], it is detected that the first icon has been moved to the second icon if the first icon overlaps with the second icon at least partially in the area adjacent to the second icon, making the detection easier.

According to the invention as described in the aforementioned mode [7], a message stating that the first screen will be reproduced soon is displayed on the display portion right before the first screen is reproduced thereon, allowing users to recognize that they can resume the unfinished icon connecting operation soon on the first screen.

According to the invention as described in the aforementioned mode [8], these conditions facilitate the judgment whether or not to make the first screen disappear from the display portion without completing the icon connecting operation.

According to the invention as described in the aforementioned mode [9], if the predetermined operation for the first icon and the second icon cannot be performed for some reasons, another screen such as an alert screen is displayed on the display portion, instead of the second screen.

According to the invention as described in the aforementioned mode [10], the present invention is applied to drag-and-drop operations by which users are allowed to connect the first icon to the second icon.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising:
a display portion which allows a user to connect a first icon to a second icon by specifying the first icon and moving it to the second icon on a first screen and is capable of displaying the first screen with a still image of the first icon in motion on a way to the second icon and a second screen matching an event that occurs to a body of the image forming apparatus;
one or more hardware processors configured to:
detect when the first icon has been moved to the second icon thus completing a connecting operation between the first icon and the second icon;
perform an operation predetermined for the first icon and the second icon when completion of the icon connecting operation is detected;
detect occurrence of the event on the body of the image forming apparatus during the icon connecting operation before completion of the icon connecting operation, the event on the body of the image forming apparatus is caused by an action other than the icon connecting operation to connect the first icon to the second icon; and
perform, when occurrence of the event on the body of the image forming apparatus is detected before completion of the icon connecting operation is detected, a first control operation consisting of:
storing on a memory, composition information of the first screen with the still image of the first icon in motion on the way to the second icon;
interrupting the first screen by making the second screen appear on the display portion; and
reproducing the first screen on the display portion after disappearance of the second screen on a basis of the composition information stored on the memory so that the still image of the first icon in motion on the way to the second icon is displayed again so as to enable the user to resume the icon connecting operation connecting the first icon to the second icon, wherein the connecting operation resumes from a position of the first icon interrupted by the second screen, wherein:
the display portion displays the first screen by displaying a base screen with a drawing layer carrying a drawing of the first icon in motion on the way to the second icon, the drawing layer being put on the base screen;
the first control operation further consisting of:
storing on the memory, a positional coordinate of the first icon on the drawing layer;
allowing the user to resume the icon connecting operation if an area in a predetermined range based on the positional coordinate of the first icon on the drawing layer is specified by a user operation after reproduction of the first screen; and
making the first screen disappear from the display portion without completing the icon connecting operation when at least one of following conditions is satisfied: a) the icon connecting operation is cancelled by the user operation; b) the first icon is connected to another object than the second icon; and c) a predetermined period of time has lapsed after reproduction of the first screen.

2. The image forming apparatus according to claim 1, wherein the one or more hardware processors are further configured to judge whether or not the first icon has been moved to an area adjacent to the second icon, the adjacent area being specified in advance, and
perform, when occurrence of the event on the body of the image forming apparatus is detected before the first icon has been moved to the area adjacent to the second icon, a second control operation consisting of:
storing on the memory, composition information of the first screen with the still image of the first icon in motion on the way to the second icon;
interrupting the first screen by making the second screen appear on the display portion; and
reproducing the first screen on the display portion after disappearance of the second screen on a basis of the composition information stored on the memory, in order for the user to resume the icon connecting operation; and
perform, when occurrence of the event on the body of the image forming apparatus is detected after the first icon has been moved to the adjacent area but before completion of the icon connecting operation is detected, a third control operation consisting of:
continuously displaying the first screen on the display portion until completion of the icon connecting operation is detected; and
making the second screen appear on the display portion after completion of the icon connection operation is detected.

3. The image forming apparatus according to claim 2, wherein the first icon overlaps with the second icon at least partially in the area adjacent to the second icon.

4. The image forming apparatus according to claim 1, wherein, when occurrence of the event on the body of the image forming apparatus is detected after completion of the icon connecting operation is detected, the one or more processors make a message stating the predetermined operation for the first icon and the second icon has successfully been completed, appear on the display portion after disappearance of the second screen.

5. The image forming apparatus according to claim 1, wherein the one or more processors make a message stating that the first screen will be reproduced, appear on the display portion before reproducing the first screen thereon.

6. The image forming apparatus according to claim 1, wherein the user is allowed to connect the first icon to the second icon by dragging and dropping the first icon to the second icon on the first screen.

7. An image forming apparatus comprising:
a display portion which allows a user to connect a first icon to a second icon by specifying the first icon and moving it to the second icon on a first screen and is capable of displaying the first screen with a still image of the first icon in motion on a way to the second icon and a second screen matching an event that occurs to a body of the image forming apparatus;
one or more processors configured to:
detect completion of the icon connecting operation;
perform an operation predetermined for the first icon and the second icon when completion of the icon connecting operation is detected;
detect occurrence of the event on the body of the image forming apparatus during the icon connecting operation, the event on the body of the image forming apparatus is caused by an action other than the icon connecting operation to connect the first icon to the second icon;
judge whether or not the first icon has been moved to an area adjacent to the second icon, the adjacent area being specified in advance;
allow the user to select any one of an interrupt mode, a user operation first mode, and a switch back and forth mode and turns on the selected mode; and
perform:
when occurrence of the event on the body of the image forming apparatus is detected during the interrupt mode which is turned on by a mode setting portion, before completion of the icon connecting operation is detected, a first control operation consisting of:
storing on a memory, composition information of the first screen with the still image of the first icon in motion on the way to the second icon;
interrupting the first screen by making the second screen appear on the display portion; and
reproducing the first screen on the display portion after disappearance of the second screen on a basis of the composition information stored on the memory so that the still image of the first icon in motion on the way to the second icon is displayed again, in order for the user to resume the icon connecting operation;
when occurrence of the event on the body of the image forming apparatus is detected during the user operation first mode which is turned on by the mode setting portion, after completion of the icon connecting operation is detected, a second control operation consisting of:
continuously displaying the first screen on the display portion until completion of the icon connecting operation is detected; and
making the second screen appear on the display portion after completion of the icon connecting operation is detected;
when occurrence of the event on the body of the image forming apparatus is detected during the switch back and forth mode which is turned on by the mode setting portion, before the first icon has been moved to the adjacent area according to a judgment portion, a third control operation consisting of:
storing on the memory, the composition information of the first screen with the still image of the first icon in motion on the way to the second icon;
interrupting the first screen by making the second screen appear on the display portion; and
reproducing the first screen on the display portion after disappearance of the second screen on the basis of the composition information stored on the memory, in order for the user to resume the icon connecting operation;
when occurrence of the event on the body of the image forming apparatus is detected after the first icon has been moved to the adjacent area according to the judgment portion but before completion of the icon connecting operation is detected, a fourth control operation consisting of:
continuously displaying the first screen on the display portion until completion of the icon connecting operation is detected; and
making the second screen appear on the display portion after completion of the icon connecting operation is detected.

8. The image forming apparatus according to claim 7, wherein when the still image of the first icon in motion on the way to the second icon is displayed again, the connecting operation resumes from a position of the first icon interrupted by the second screen.

* * * * *